(12) United States Patent
McKinstrie (10) Patent No.: US 7,724,421 B2
(45) Date of Patent: May 25, 2010

(54) PHASE SENSITIVE OPTICAL AMPLIFICATION (75) Inventor: Colin McKinstrie, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 281 days.

(21) Appl. No.: 11/750,252

(22) Filed: May 17, 2007

(65) Prior Publication Data

US 2007/0216994 A1 Sep. 20, 2007

Related U.S. Application Data (63) Continuation-in-part of application No. 11/154,483, filed on Jun. 16, 2005, now Pat. No. 7,483,203.

(51) Int. Cl.
*H01S 3/00* (2006.01)
(52) U.S. Cl. .................. 359/333; 359/334; 359/330
(58) Field of Classification Search .............. 359/334, 359/333, 330
See application file for complete search history.

(56) References Cited

U.S. PATENT DOCUMENTS

| 5,504,616 | A | * | 4/1996 | Shinozaki et al. | 359/326 |
| 6,414,786 | B1 | * | 7/2002 | Foursa | 359/334 |
| 6,833,947 | B2 | * | 12/2004 | Cussat-Blanc et al. | 359/334 |
| 7,245,422 | B2 | * | 7/2007 | Tanaka | 359/334 |
| 2006/0285197 | A1 | | 12/2006 | McKinstrie | |

OTHER PUBLICATIONS

McKinstrie C J et al: "Quantum Mechanics of Phase-Sensitive Amplification in a Fiber"; Optics Communications, Norty-Holland Publishing Co. Amsterdam, NL; vol. 257, No. 1, Jan. 1, 2006, pp. 146-163.
Mckinstrie C J et al: "Phase Sensitive Amplification in a Fiber" Optics Express Opt. Soc. America USA, vol. 4, Oct. 2004 (Oct. 4,2 004), pp. 4973-4979.
Mckinstrie C J et al: "Phase Sensitive Amplification Produced by Degenerate Four-Wave Mixing in a Fiber", Lasers and Electro-Optics, 2005 (CLEO) Conference on Baltimore, MD, USA May 22-27, 2005, Piscataway NJ, USA, IEEE vol. 2, May 22, 2005.
Marhic M E et al: "Current Status of Fiber Optical Parametric Amplifiers" Proc. of SPIE vol. 6014, 2005, pp. 601405-1-601405-15.
Takano K et al: "Phase Sensitive Amplifier Based on Two-Pump, Four-Wave Mixing in an Optical Fiber", European Conference on Optical Communication (ECOC), 2006, pp. 1-2.

* cited by examiner

*Primary Examiner*—Mark Hellner
(74) *Attorney, Agent, or Firm*—Brosemer, Kolefas & Associates (57) ABSTRACT Phase-sensitive amplification (PSA), which is produced by degenerate four-wave mixing (FWM) in a randomly-birefringent fiber, has the potential to improve the performance of optical communication systems. Scalar FWM, which is driven by parallel pumps, is impaired by the generation of pump-pump and pump-signal harmonics, which limit the level, and modify the phase sensitivity, of the signal gain. In contrast, vector FWM, which is driven by perpendicular pumps, is not impaired by the generation of harmonics. Vector FWM produces PSA with the classical properties of a one-mode squeezing transformation.

21 Claims, 14 Drawing Sheets

PHASE SENSITIVE OPTICAL AMPLIFICATION

CROSS REFERENCE TO RELATED APPLICATION

This application is a continuation-in-part of application Ser. No. 11/154,483 of Colin McKinstrie, entitled "PHASE-SENSITIVE AMPLIFICATION IN A FIBER," filed Jun. 16, 2005. The entirety of the disclosure in that application is hereby incorporated by reference into this application.

TECHNICAL FIELD

This application relates to optical signal processing devices. More particularly, this application relates to optical amplifiers used in optical communications systems.

BACKGROUND

Figure 1A:
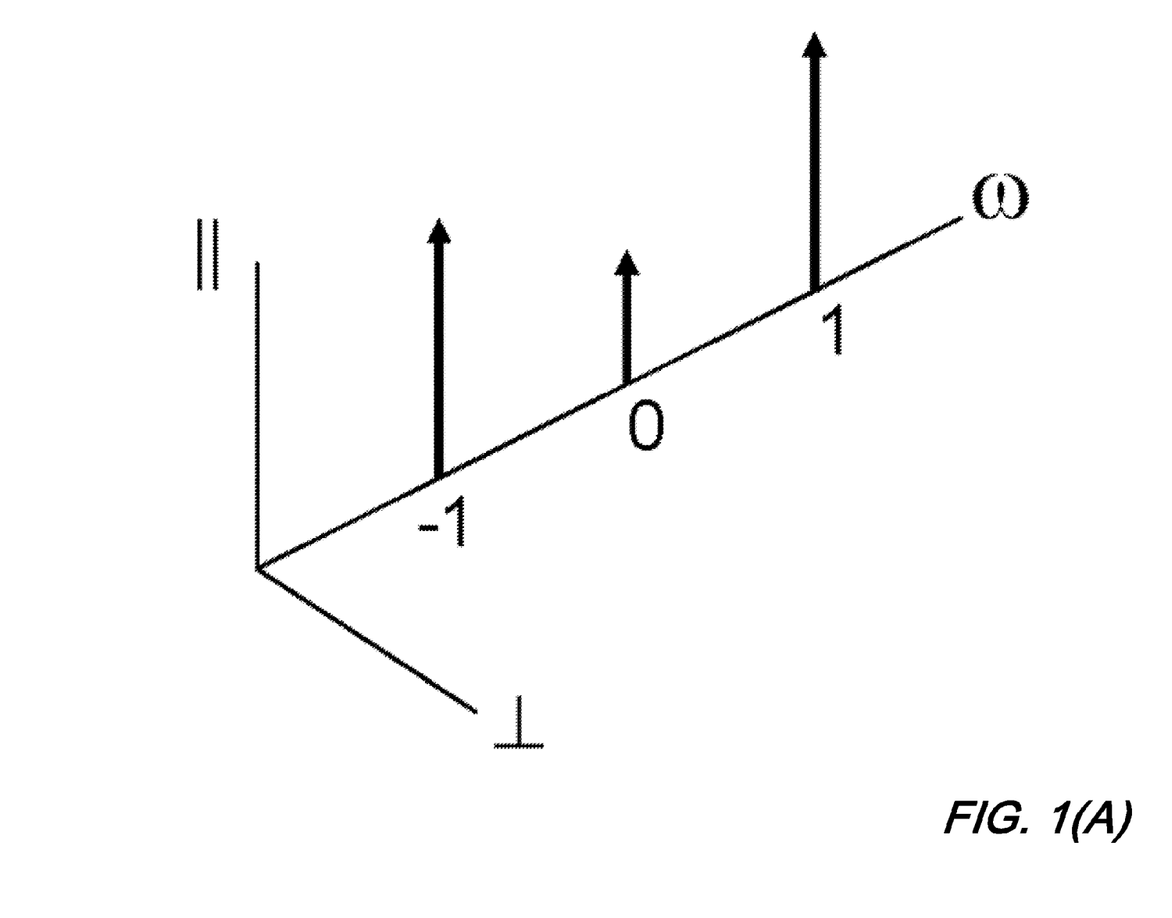
FIGS. 1(A) and 1(B) are polarization diagrams illustrating 1(A) degenerate scalar four-wave mixing and 1(B) degenerate vector four-wave mixing, respectively.
Figure 1B:
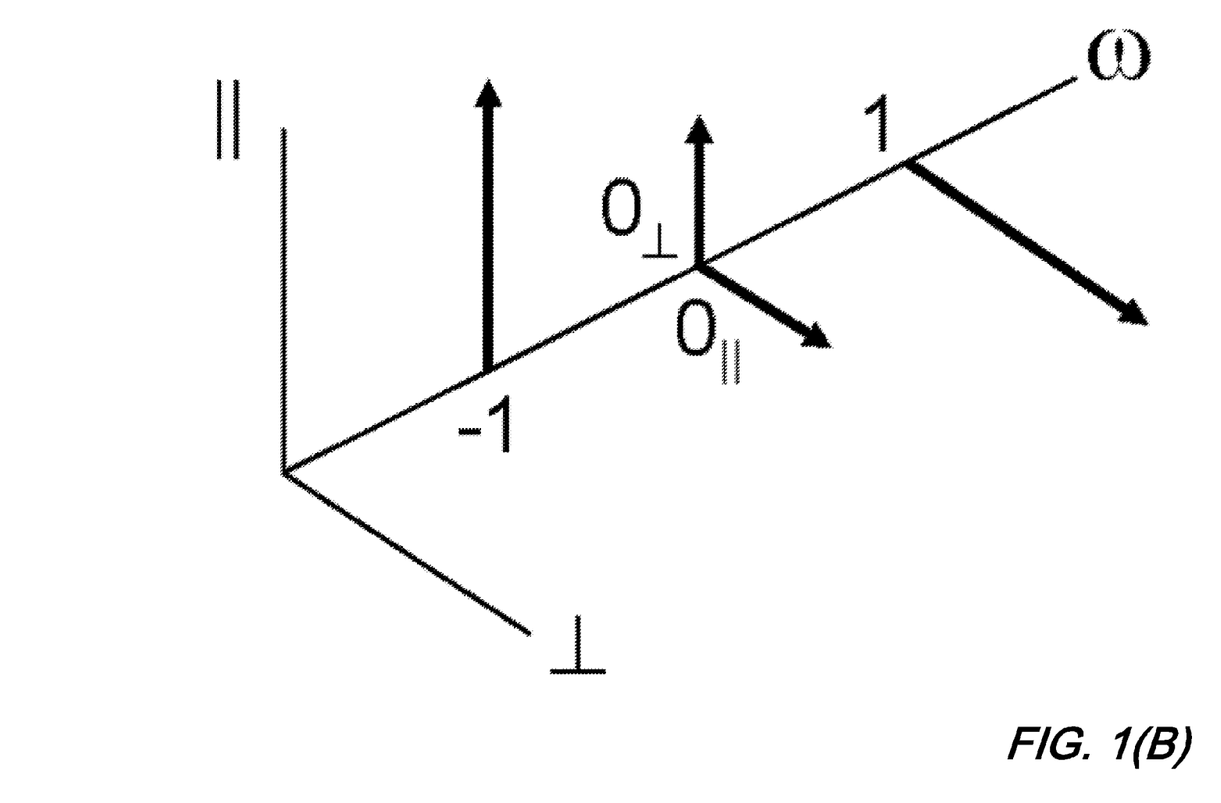
Figure 2A:
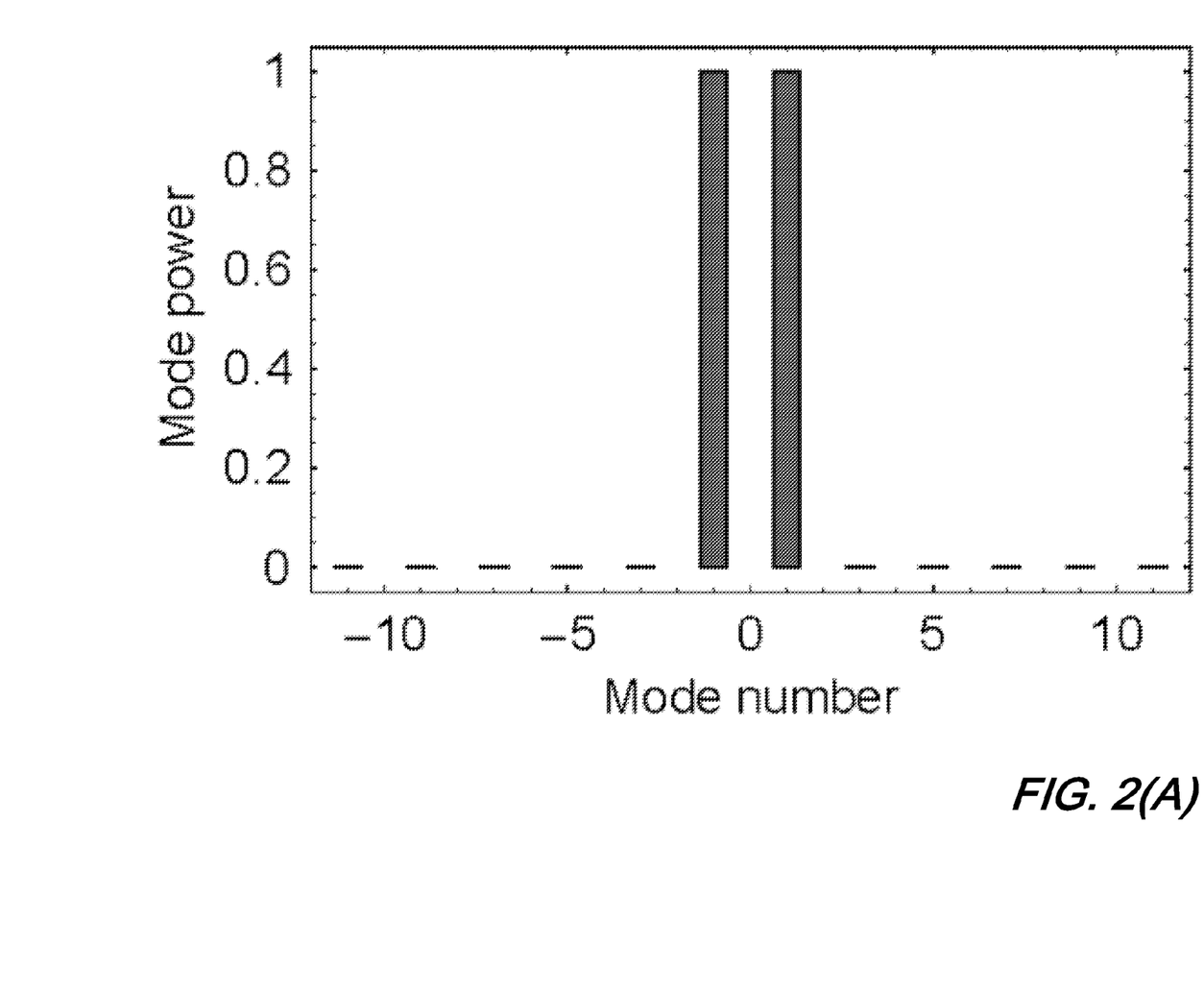
FIGS. 2(A)-2(F) shows mode powers plotted as functions of mode number for cases in which the input amplitudes $\rho_\pm = 1$ and the input polarization-angle $\theta_- = 0$. The other angle $\theta_+ = 0$ (2(A), 2(B)), $\theta_+ = \pi/4$ (2(C), 2(D)), and $\theta_+ = \pi/2$ (2(E), 2(F)), and the distance z=0 (2(A), 2(C), 2(E)) and z=3 (2(B), 2(D), 2(F)). Solid bars represent x-components, whereas cross-hatched bars represent y-components.
Figure 2B:
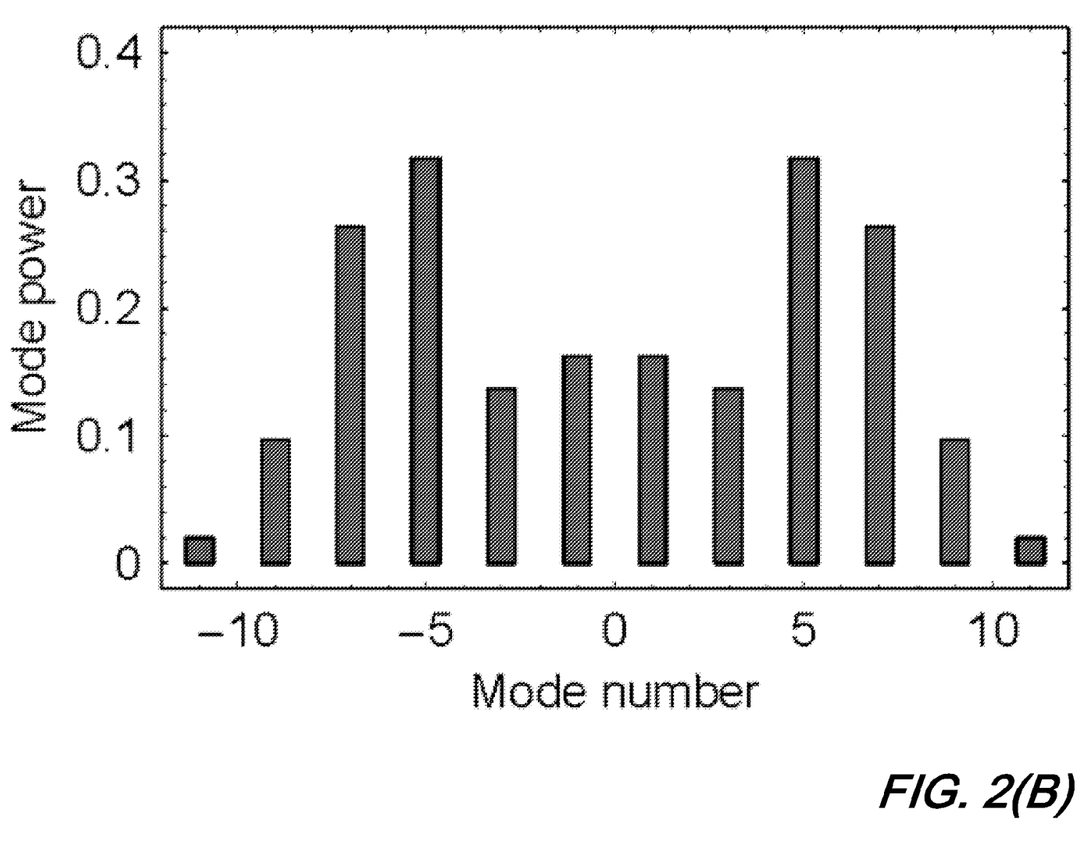
Figure 2C:
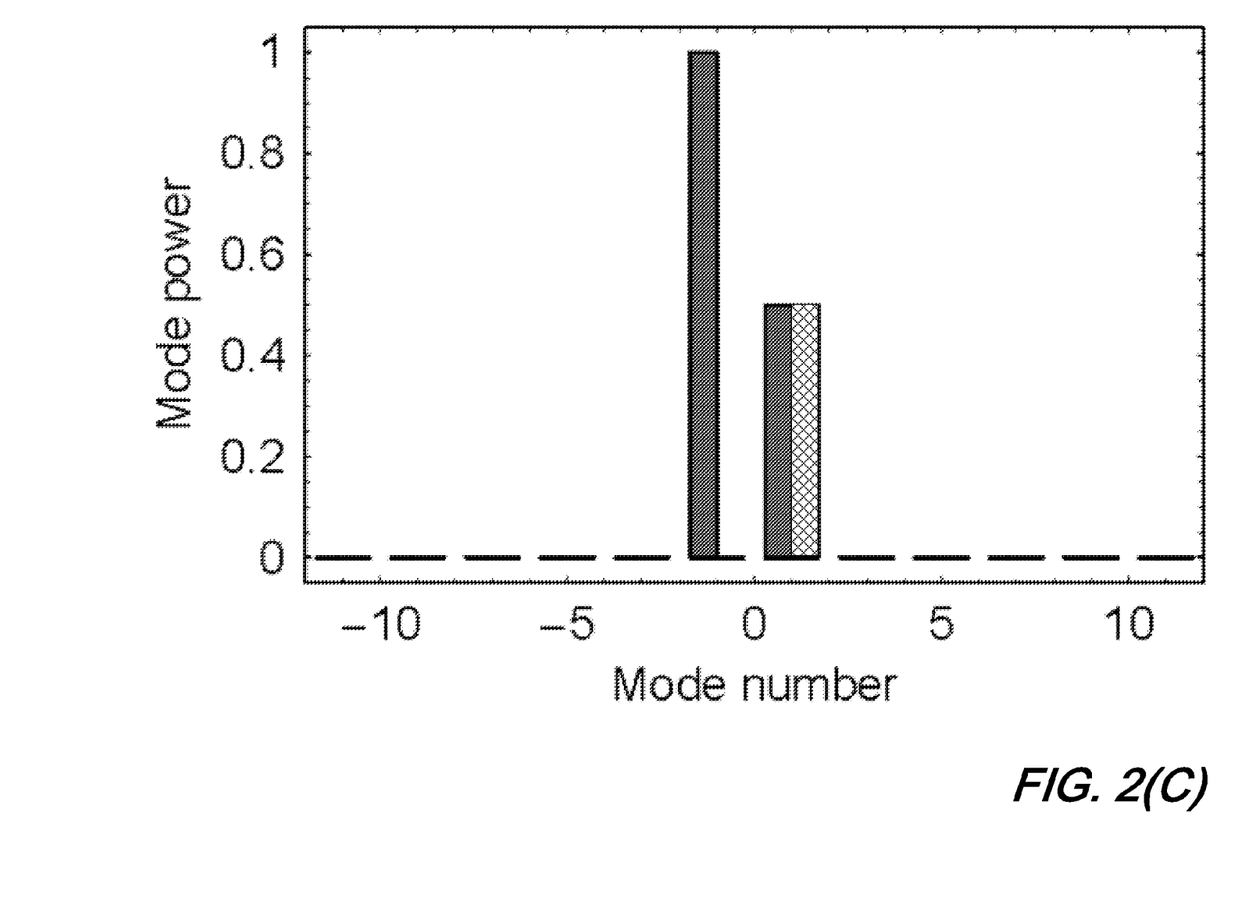
Figure 2D:
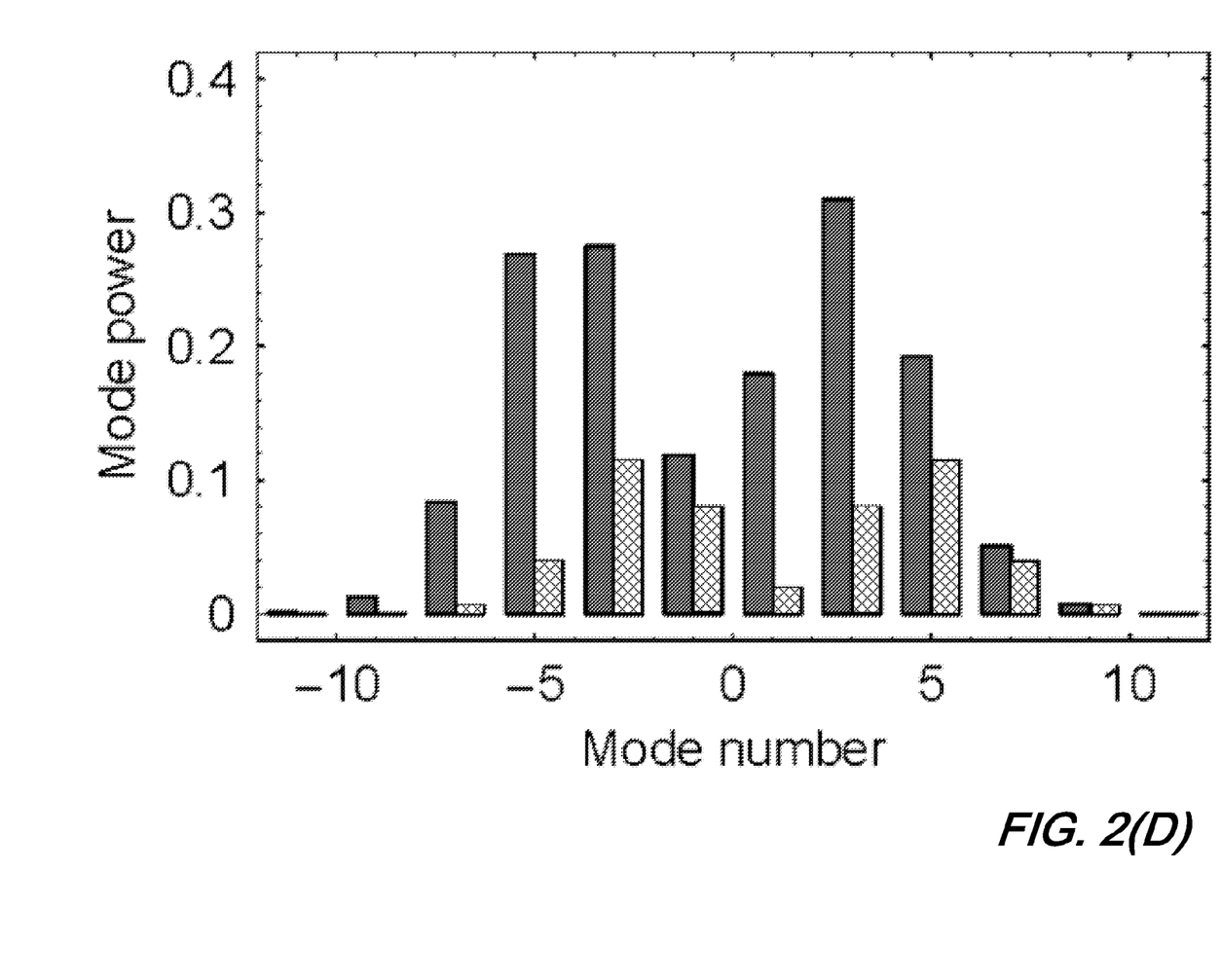
Figure 2E:
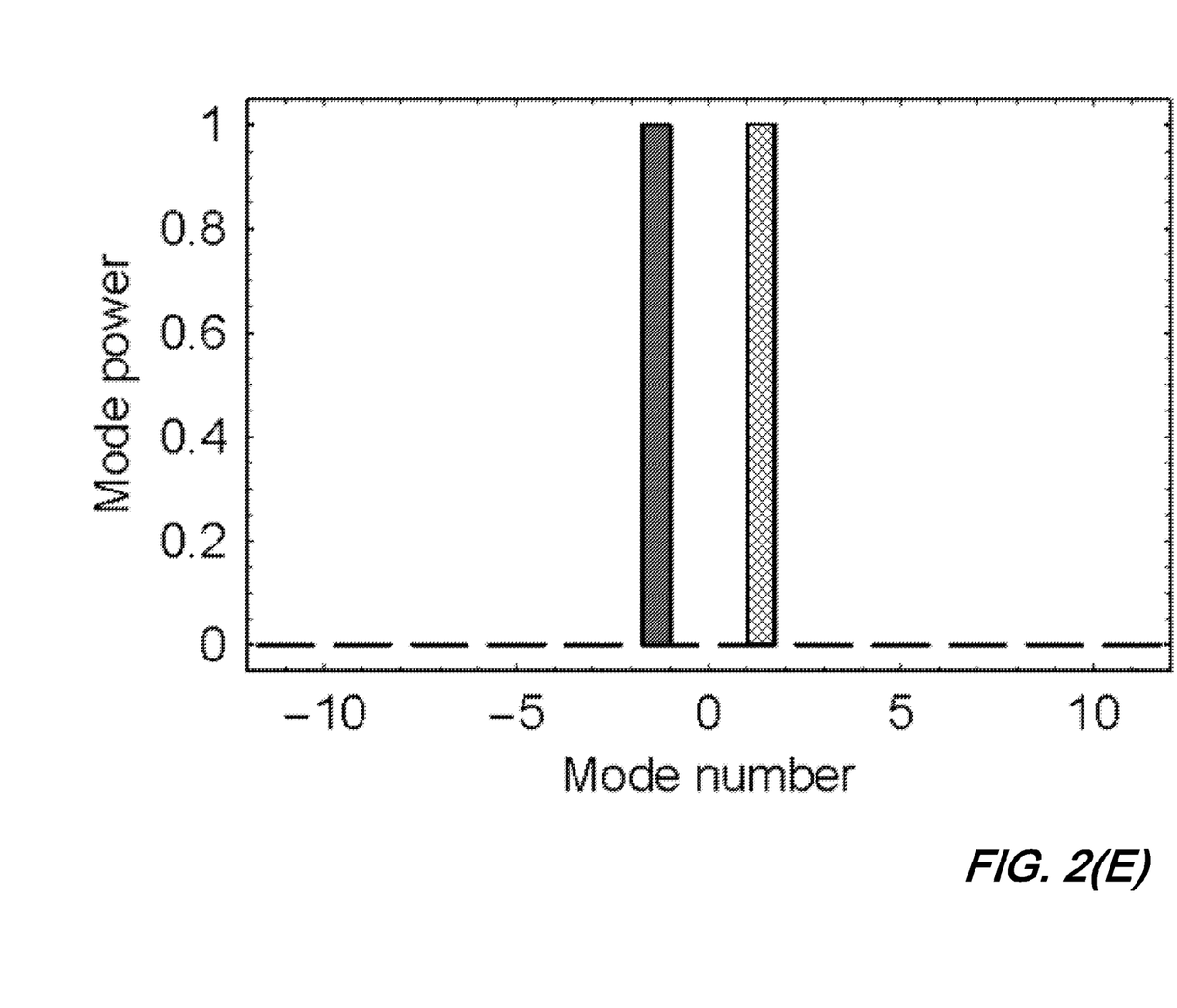
Figure 2F:
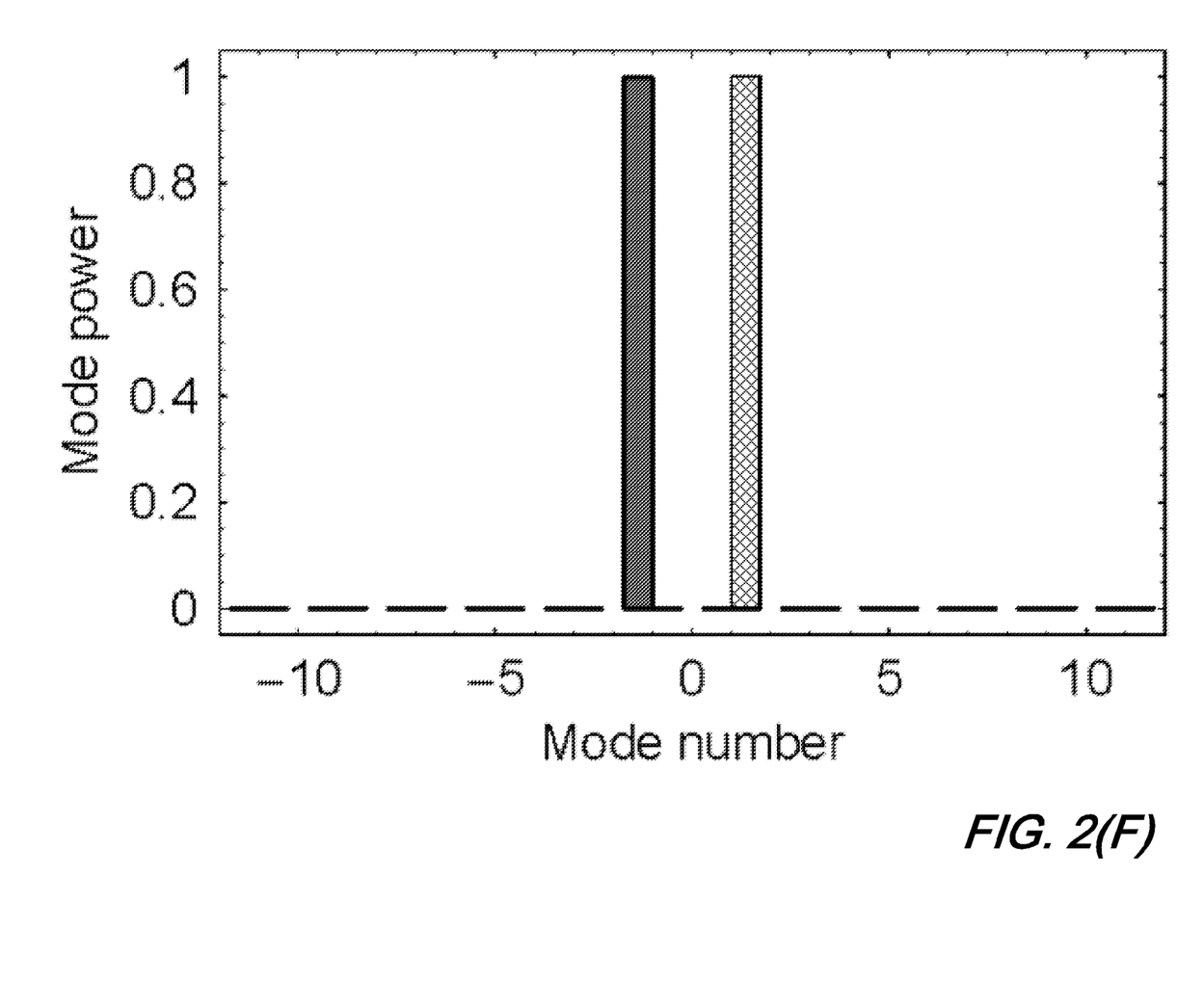

Long-haul communication systems require optical amplifiers to compensate for fiber loss. Current systems use erbium-doped or Raman fiber amplifiers. These amplifiers are examples of phase-insensitive amplifiers (PIAs), which produce signal gain that is independent of the signal phase. In principle, phase-sensitive amplifiers (PSAs) could also be used. The potential advantages of PSAs include, but are not limited to, noise reduction (See, e.g., R. Loudon, "Theory of noise accumulation in linear optical-amplifier chains," IEEE J. Quantum Electron. 21, 766-773 (1985)) the reduction of noise- and collision-induced phase (See, e.g., Y. Mu and C. M. Savage, "Parametric amplifiers in phase-noise-limited optical communications," J. Opt. Soc. Am. B 9, 65-70 (1992), and frequency (See, e.g., H. P. Yuen, "Reduction of quantum fluctuation and suppression of the Gordon-Haus effect with phase-sensitive linear amplifiers," Opt. Lett. 17, 73-75 (1992)) fluctuations, and dispersion compensation (See, e.g., R. D. Li, P. Kumar, W. L. Kath and J. N. Kutz, "Combating dispersion with parametric amplifiers," IEEE Photon. Technol. Lett. 5, 669-672 (1993)). Previous papers (See, e.g., C. J. McKinstrie and S. Radic, "Phase-sensitive amplification in a fiber," Opt. Express 12, 4973-4979 (2004); and C. J. McKinstrie, M. G. Raymer, S. Radic and M. V. Vasilyev, "Quantum mechanics of phase-sensitive amplification in a fiber," Opt. Commun. 257, 146-163 (2006)) showed that degenerate four-wave mixing (FWM) in a randomly birefringent fiber (RBF) produces phase-sensitive amplification (PSA), provided that the signal frequency ($\omega_0$) is the average of the pump frequencies ($\omega_{-1}$ and $\omega_1$). Degenerate scalar and vector FWM are illustrated in FIGS. 1($a$) and 1($b$), respectively. In degenerate scalar FWM (inverse modulation interaction), $\gamma_{-1}+\gamma_1 \rightarrow 2\gamma_0$, where $\gamma_j$ represents a photon with frequency $\omega_j$. In degenerate vector FWM, (degenerate phase conjugation), $\gamma_{-1}+\gamma_1 \rightarrow \gamma_\parallel \gamma_\perp$, where the subscript 0 was omitted for simplicity. If one assumes that each interaction involves only the aforementioned pumps and signal, then each interaction produces PSA with the classical properties of a one-mode squeezing transformation.

FWM processes are driven by pump- and signal-induced nonlinearities and are limited by dispersion-induced wave number shifts. If the pump frequencies differ significantly, strong dispersion prevents other FWM processes from occurring and the preceding assumption is valid. However, it is difficult to phase lock pumps with dissimilar frequencies, which are usually produced by two separate lasers. In contrast, it is easy to phase lock pumps with similar frequencies, which can be produced by one laser and a phase modulator. However, if the pump frequencies are similar, dispersion is too weak to counter nonlinearity and other FWM processes occur.

A previous paper on scalar FWM (See, e.g., C. J. McKinstrie and M. G. Raymer, "Four-wave-mixing cascades near the zero-dispersion frequency," Opt. Express 14, 9600-9610 (2006)) showed that, if the pump frequencies are comparable to the zero-dispersion frequency (ZDF) of the fiber, a cascade of product waves (harmonics) is produced. These harmonics limit the level, and modify the phase sensitivity, of the signal gain. Accordingly, there is a need for a way to achieve phase sensitive amplification without the problems caused by frequency cascades.

SUMMARY

In one embodiment of the invention, a phase sensitive optical amplifier comprises a non-linear optical fiber. A first pump is adapted to input polarized electromagnetic energy into the optical fiber. The input polarized electromagnetic energy has a first polarization angle and a first wavelength. A second pump is adapted to input polarized electromagnetic energy having a second polarization angle and a second wavelength into the optical fiber. An optical communication signal source adapted to input into the fiber polarized electromagnetic signal energy having a third polarization angle between the first and second polarization angles and a third wavelength between the first and second wavelengths.

In one variation, pump electromagnetic energy having a first polarization angle and a first wavelength and pump electromagnetic energy having a second polarization angle and a second wavelength is produced by a single phase modulated laser.

In a preferred embodiment of the invention, the pumps are orthogonal, and the input signal power is split evenly between the pump polarizations. In this situation, vector four-wave mixing does not produce pump-pump harmonics, but does produce phase-sensitive amplification with the aforementioned classical properties.

BRIEF DESCRIPTION OF THE DRAWINGS

FIGS. 3(A) and 3(B) show normalized mode powers plotted as functions of mode number for the case in which the input amplitudes $\rho = 1$ and $\rho_0 = 0.01$, and the input phase $\phi_0 = 0$. In FIG. 3(A), the distance z=0, and in FIG. 3(B), z=5. Solid bars represent x-components, whereas cross-hatched bars represent y-components.

FIGS. 4(A) and 4(B) show normalized signal power plotted as a function of phase and distance for the case in which the input amplitudes $\rho = 1$ and $\rho_0 = 0.01$. In FIG. 4(A), the distance z=5, and in FIG. 4(B), the input phases $\phi_0 = 0.099$ and $\phi_0 = 1.67$. In the phase plot, the exact and approximate results are denoted by solid and dashed curves, respectively. In the distance plot, they are represented by solid and long-dashed curves (amplification), and dot-dashed and short-dashed curves (attenuation). The exact and approximate curves are nearly indistinguishable.

DETAILED DESCRIPTION

1. Introduction

This disclosure is organized as follows. In Section 2 the coupled-mode equations (CME's), which model wave propagation in a dispersionless randomly birefringent fiber (RBF), are stated and solved for arbitrary input conditions. These solutions are used to study pump-pump and pump-signal four-wave mixing (FWM) cascades, in Sections 3 and 4, respectively. Illustrative preferred embodiments of the invention are described in detail in Section 5. Finally, in Section 6 the main results of this report are summarized.

2. Wave Propagation in a Fiber

Wave propagation in a RBF is governed by the coupled Schroedinger equations (CSEs):

$$-i\partial_z X = \beta(i\partial_\tau)X + \gamma(|X|^2+|Y|^2)X \quad (1)$$

$$-i\partial_z Y = \beta(i\partial_\tau)Y + \gamma(|X|^2+|Y|^2)Y \quad (2)$$

where z is distance, $\partial_z = \partial/\partial_z$, X and Y are the amplitude (polarization) components of the wave, and $\beta$ is the dispersion function of the fiber. In the frequency domain $\beta(\omega) = \Sigma_{n \geq 2} \beta_n(\omega_c)\omega^n/n!$, where $\omega_c$ is the carrier frequency of the wave and $\omega$ is the difference between the actual and carrier frequencies. To convert from the frequency domain to the time domain, one replaces $\omega$ by $i\partial_\tau$, where $\tau = t - \beta_1 z$ is the retarded time and $\beta_1(\omega_c)$ is the group slowness. The nonlinearity coefficient $\gamma = 8\gamma_K/9$, where $\gamma_K$ is the Kerr coefficient. Equations (1) and (2) are valid in a frame that rotates randomly with the polarization axes of a reference wave.

As stated in the Background, and discussed in (See, e.g., K. Inoue, "Polarization effect on four-wave mixing efficiency in a single-mode fiber," IEEE J. Quantum Electron. 28, 883-894 (1992).)), if the frequencies of the interacting waves are comparable to the zero-dispersion frequency (ZDF) of the fiber, the effects of dispersion are much weaker than those of nonlinearity and can be neglected. In this limit ($\beta=0$), the CSEs reduce to the CMEs:

$$\partial_z X = i\gamma(|X|^2+|Y|^2)X \quad (3)$$

$$\partial_z Y = i\gamma(|X|^2+|Y|^2)Y \quad (4)$$

which model the effects of self-phase modulation (SPM) and cross-phase modulation (CPM). The notation and language of this report are based on the assumption that the basis vectors for the wave amplitude are linearly polarized (LP). However, Eqs. (3) and (4) are valid for any pair of orthogonal vectors, including counter-rotating circularly-polarized (CP) vectors. Each polarization component depends implicitly on the retarded time.

The CMEs have the simple solutions:

$$X(\tau,z) = X(\tau,0)\exp(i\gamma[|X(\tau,0)|^2+|Y(\tau,0)|^2]z) \quad (5)$$

$$Y(\tau,z) = Y(\tau,0)\exp(i\gamma[|X(\tau,0)|^2+|Y(\tau,0)|^2]z) \quad (6)$$

Because solutions (5) and (6) contain only the effects of nonlinearity, it is convenient to let P be a reference power, $X/P^{1/2} \to X$, $Y/P^{1/2} \to Y$, and $\gamma P_z \to z$, in which case the amplitude and distance variables are dimensionless, and $\gamma$ is absent from the solutions.

3. Pump-Pump Cascade

Consider the two-frequency boundary (initial) conditions $$X(\tau,0) = \rho_- \cos\theta_- \exp(i\phi_-) + \rho_+ \cos\theta_+ \exp(i\phi_+) \quad (7)$$

$$Y(\tau,0) = \rho_- \sin\theta_- \exp(i\phi_-) + \rho_+ \sin\theta_+ \exp(i\phi_+) \quad (8)$$

where $\phi_+ = -\omega\tau + \phi_1(0)$ and $\phi_- = \omega\tau + \phi_{-1}(0)$. These conditions correspond to two pumps (±1) with frequencies $\mp\omega$, which are inclined at the angles $\theta_\pm$ relative to the x-axis. The input power has the time average $\rho_+^2 + \rho_-^2$ and the contribution $2\rho_+\rho_- \cos(\theta_+ - \theta_-)\cos(\phi_+ - \phi_-)$, which oscillates at the difference frequency $2\omega$. The input power depends on the phase difference $\phi_d = \phi_+(0) - \phi_-(0)$, but does not depend on the phase average $\phi_a = \phi_+(0) + \phi_-(0)$. By measuring phase relative to the reference phase $\phi_a$, and time relative to the reference time $\phi_d/\omega$, one can rewrite conditions (7) and (8) in the simpler forms:

$$X(\tau,0) = \rho_- \cos\theta_- \exp(i\phi) + \rho_+ \cos\theta_+ \exp(-i\phi) \quad (9)$$

$$Y(\tau,0) = \rho_- \sin\theta_- \exp(i\phi) + \rho_+ \sin\theta_+ \exp(-i\phi) \quad (10)$$

where $\phi = \omega\tau$.

By using the identity $\exp(i\zeta \cos\psi) = \Sigma_m J_m(\zeta)\exp(-im\psi)$, where the distance parameter $\zeta = 2\rho_+\rho_- \cos(\theta_+ - \theta_-)z$, the phase parameter $\psi = 2\phi$, and m is an integer, one can write solutions (5) and (6) as the series $X(\tau,z) = \Sigma_n X_n(z)\exp(-in\phi)$ and $Y(\tau,z) = \Sigma_n Y_n(z)\exp(-in\phi)$. The frequency components (harmonics) are:

$$X_n(\zeta) = \rho_- \cos\theta_- i^{(n+1)/2} J_{(n+1)/2}(\zeta) + \rho_+ \cos\theta_+ i^{(n-1)/2} J_{(n-1)/2}(\zeta) \quad (11)$$

$$Y_n(\zeta) = \rho_- \sin\theta_- i^{(n+1)/2} J_{(n+1)/2}(\zeta) + \rho_+ \sin\theta_+ i^{(n-1)/2} J_{(n-1)/2}(\zeta) \quad (12)$$

where n is an odd integer and the (common) phase factor $\exp[i(\rho_+^2+\rho_-^2)z]$ was omitted for simplicity. For continuous-wave inputs $\rho_\pm$ are constant (as are $\phi_a$ and $\phi_d$), whereas for pulsed inputs they vary slowly with time (as do $\phi_a$ and $\phi_d$). As distance increases, so also does the number of harmonics (modes) with significant power. Equations (11) and (12) describe a vector FWM cascade. Notice that the mode powers $|X_n|^2$ and $|Y_n|^2$ do not depend on the input phases. This pump-pump cascade is PI.

The evolution of the cascade is illustrated in FIG. 2, for the initial conditions $\rho_\pm = 1$ and $\theta = 0$. In each row, the polarization components of the pump spectrum (pump spectra) are displayed for two distances, z=0 and z=3. The first row corresponds to pumps that are parallel initially ($\theta_+ = 0$), the second row corresponds to oblique pumps ($\theta_+ = \pi/4$), and the third row corresponds to perpendicular pumps ($\theta_+ = \pi/2$). FIGS. 2(A) and 2(B) show that, if the pumps are x-polarized initially, they remain x-polarized. The CME's do not allow a transfer of power from one component to the other. If the pumps are oblique, an FWM cascade also occurs. However, the cascade in FIG. 2(D) is less developed than the cascade in FIG. 2(B), because the oscillations in total power are weaker ($\zeta$ is smaller). If the pumps are perpendicular, the total power is constant, so no cascade occurs, as shown in FIG. 2(F). It was shown in [10, 11] that perpendicular pumps in RBFs do not produce the lowest FWM products (modes −3 and 3). The preceding analysis shows that they produce no FWM products whatsoever. The spectra displayed in FIG. 2 (and FIG. 3) were validated by calculating the Fourier transforms of solutions (5) and (6) numerically.

4. Pump-Signal Cascades

Now consider the three-frequency initial conditions:

$$X(\tau,0) = \rho\exp(i\phi) + \hat{\rho}_0\exp(i\phi_0) \tag{13}$$

$$Y(\tau,0) = \hat{\rho}_0\exp(i\phi_0) + \rho\exp(-i\phi) \tag{14}$$

where $\rho$, $\hat{\rho}_0 = \rho_0/2^{1/2}$, and $\phi_0$ are constants (or slowly-varying functions of time). These conditions correspond to two pumps of equal power and a signal whose frequency is the average of the pump frequencies (0). The pumps are perpendicular, and the signal is polarized at 45° to the pumps. For these conditions, the input power has the time-average $2\rho^2 + \rho_0^2$ and the contribution $4\rho\hat{\rho}_0 \cos\phi_0 \cos\phi$, which oscillates at the difference frequency $\omega$. By using the aforementioned identity, one finds that the solutions can be written as the harmonic series defined before Eq. (11). The harmonics are:

$$X_n(\zeta) = i^{n+1}J_{n+1}(\zeta)\rho + i^n J_n(\zeta)\hat{\rho}_0\exp(i\phi_0) \tag{15}$$

$$X_n(\zeta) = i^{n+1}J_{n+1}(\zeta)\rho + i^n J_n(\zeta)\hat{\rho}_0\exp(i\phi_0) \tag{16}$$

where n is an integer, $\zeta = 4\rho\hat{\rho}_0 \cos\phi_0 z$, and the (common) phase factor $\exp[i(2\rho^2 + \rho_0^2)z]$ was omitted. Notice that the harmonics depend on $\phi_0$. This pump-signal cascade is PS.

It follows from Eq. (15) that:

$$X_0(\zeta) = iJ_1(\zeta)\rho + J_0(\zeta)\hat{\rho}_0\exp(i\phi_0) \tag{17}$$

The formula for $Y_0$ is identical. In the linear regime ($\zeta \ll 1$), the output signal is proportional to the input signal. (Because $\rho_0 \ll 1$, it is possible that $\zeta \ll 1$ and $\rho^2 z \sim 1$ simultaneously.) In this regime, $$X_0(z) \approx (1+i\rho^2 z)\hat{\rho}_0\exp(i\phi_0) + i\rho^2 z\hat{\rho}_0\exp(-i\phi_0) \tag{18}$$

Although Eq. (18) is only part of an approximate solution of the CME's, it is the exact solution of the FWM equations for the standard PS process (C. J. McKinstrie and S. Radic, "Phase-sensitive amplification in a fiber," Opt. Express 12, 4973-4979 (2004); C. J. McKinstrie, M. G. Raymer, S. Radic and M. V. Vasilyev, "Quantum mechanics of phase-sensitive amplification in a fiber," Opt. Commun. 257, 146-163 (2006)), which involves only modes −1, 0, and 1 [FIG. 1(b)]. It follows from Eq. (18), and its counterpart for $Y_0$, that the signal power:

$$P_0(z) \approx \rho_0^2[1+2(\rho^2 z)^2+2(\rho^2 z)\sin(2\phi_0)+2(\rho^2 z)^2\cos(2\phi_0)] \tag{19}$$

It follows from Eq. (19) that the signal gain $P_0(z)/\rho_0^2$ attains its extremal values when $2\phi_0 = \tan^{-1}(1/\rho^2 z)$. Let $\mu = 1+i\rho^2 z$ and $\nu = i\rho^2 z$. Then the first-quadrant value of $2\phi_0$ corresponds to the maximal gain $(|\mu|+|\nu|)^2$, whereas the third-quadrant value corresponds to the minimal gain $(|\mu|-|\nu|)^2$. It also follows from Eq. (15) that, in the linear regime, $$X_{-2}(z) \approx i2\rho^2 z\hat{\rho}_0 \cos\phi_0 \tag{20}$$

For long distances, ($\rho^2 z > 1$), $X_{-2} \approx X_0$. Similar results apply to $Y_2$.

Figure 3A:
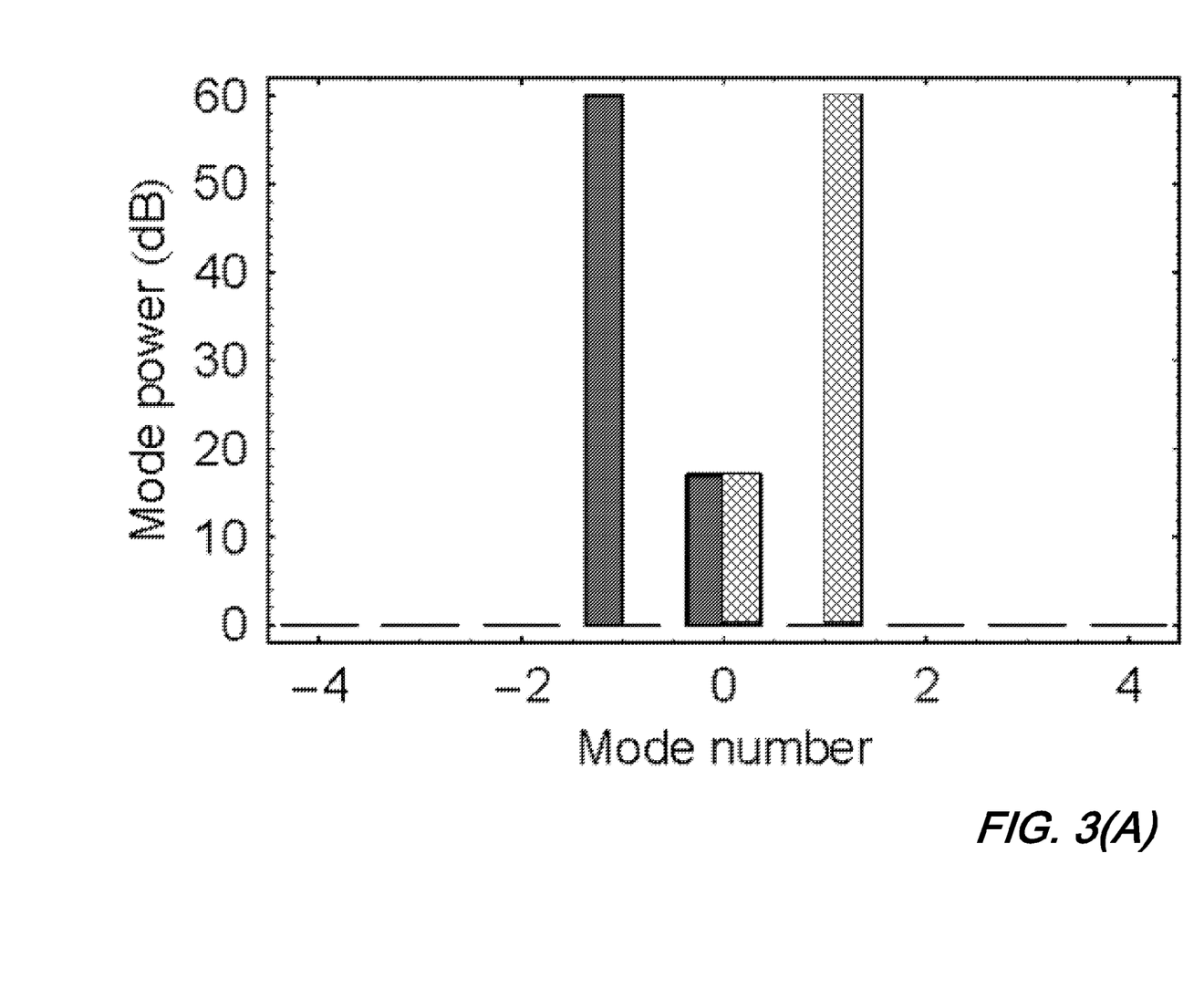
Figure 3B:
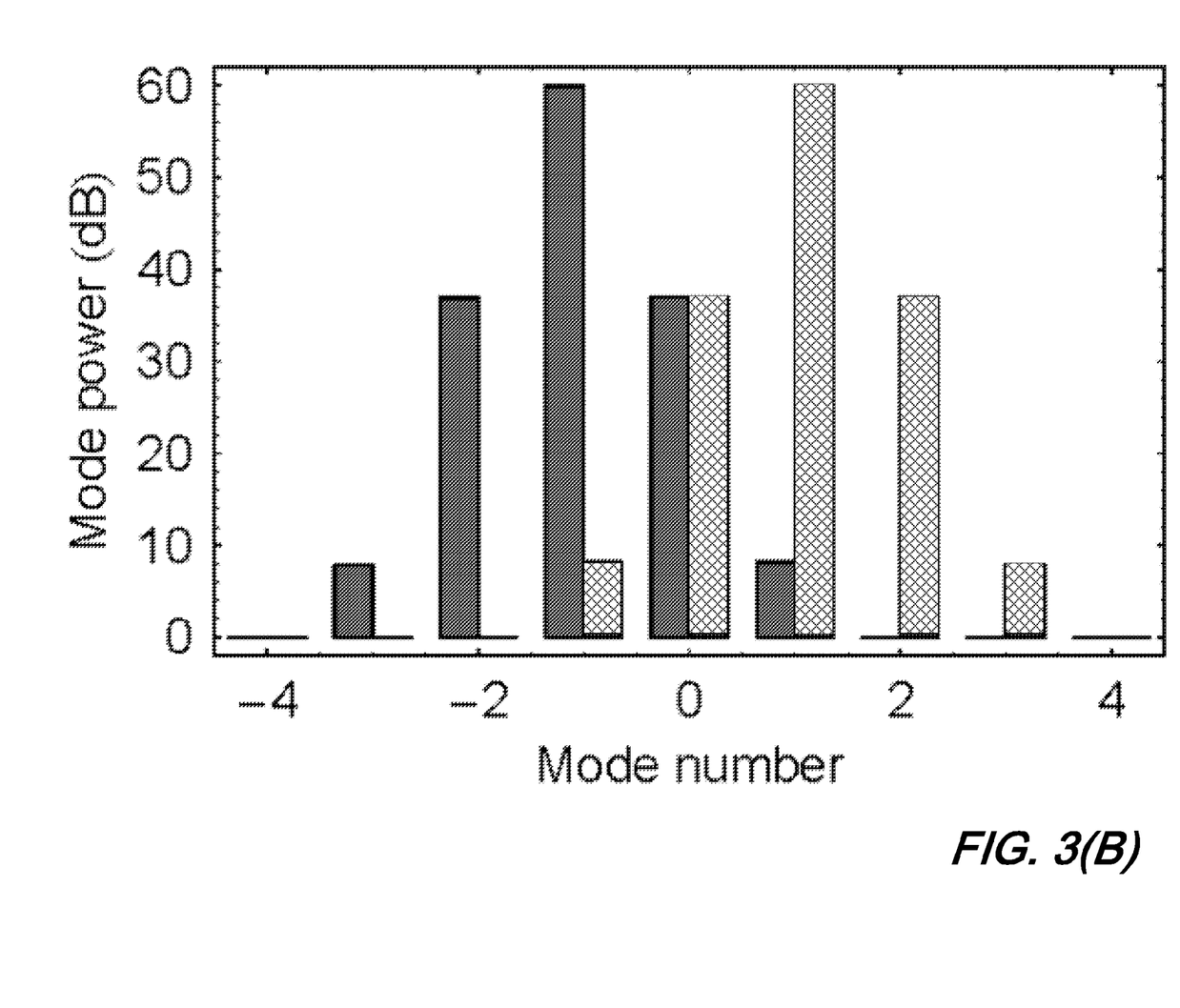

The evolution of the pump-signal cascade is illustrated in FIG. 3, for the case in which $\rho = 1$, $\rho_0 = 0.01$, and $\phi_0 = 0$. Spectra are displayed for $z=0$ and $z=5$. Power is normalized to $10^{-6}$, so the input pump powers $P_{\pm 1} = 1$ correspond to 60 dB and the input signal power $P_0 = 10^{-4}$ corresponds to 20 dB. (Each component of the signal has a power of 17 dB.) The output signal power is about 40 dB (37 dB in each component). In addition to a strong output signal, FWM produces two strong idler modes: mode −2, which is x-polarized, and mode 2, which is y-polarized. Mode −2 is generated by the FWM processes in which $2\gamma_{-1} \to \gamma_{-2}+\gamma_0$ and $\gamma_{-1}+\gamma_0 \to \gamma_{-2}+\gamma_1$, and enhanced by the process in which $\gamma_{-1}+\gamma_1 \to \gamma_{-2}+\gamma_2$. Similar processes produce mode 2. The scalar cascade produces many idlers, whose powers are comparable to the signal power, and whose presence limits the signal gain (See, e.g., K. Inoue, "Polarization effect on four-wave mixing efficiency in a single-mode fiber," IEEE J. Quantum Electron. 28, 883-894 (1992)). In contrast, the vector cascade produces only two idlers, whose presence does not affect the signal gain significantly.

Figure 4A:
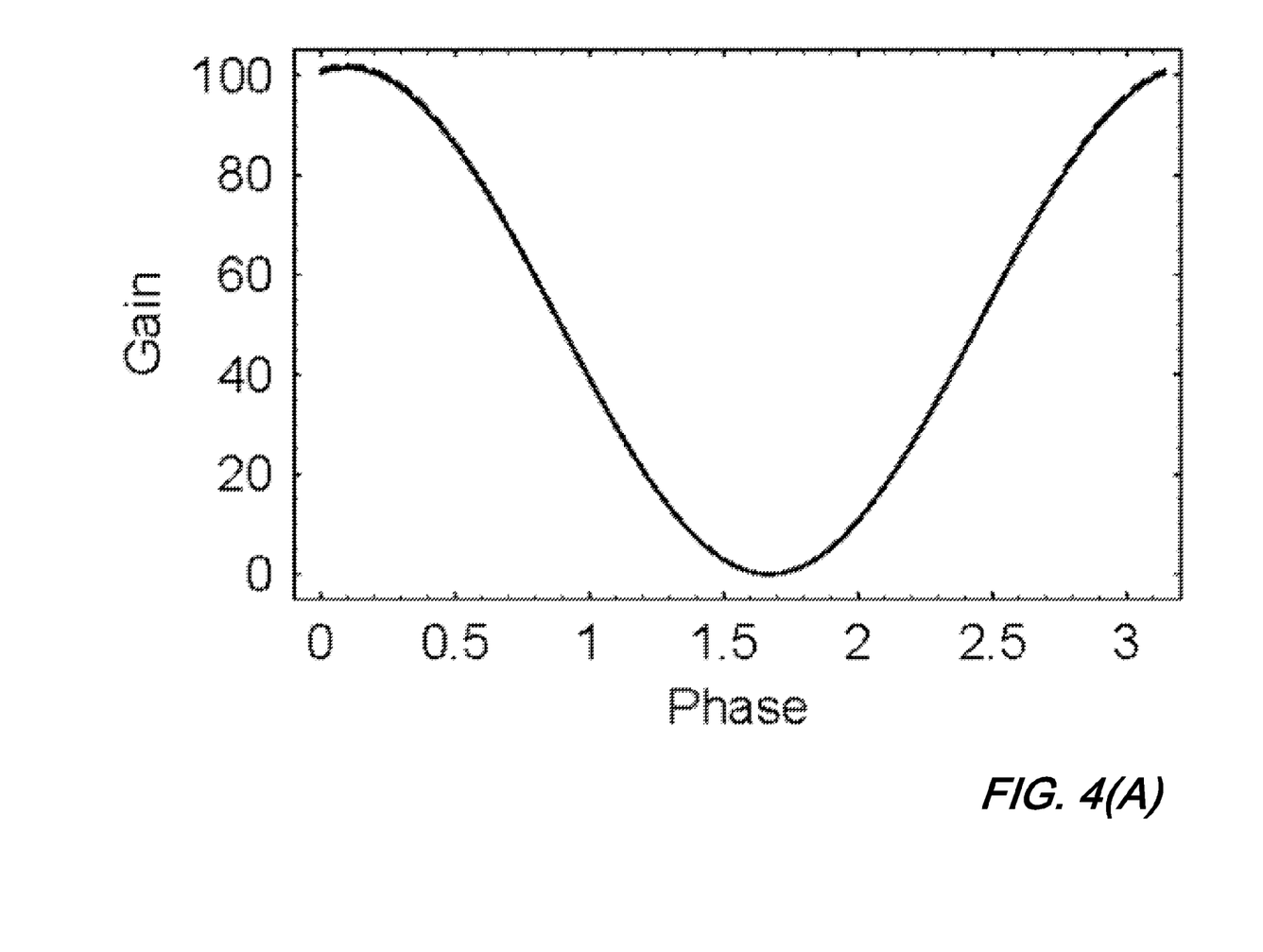
Figure 4B:
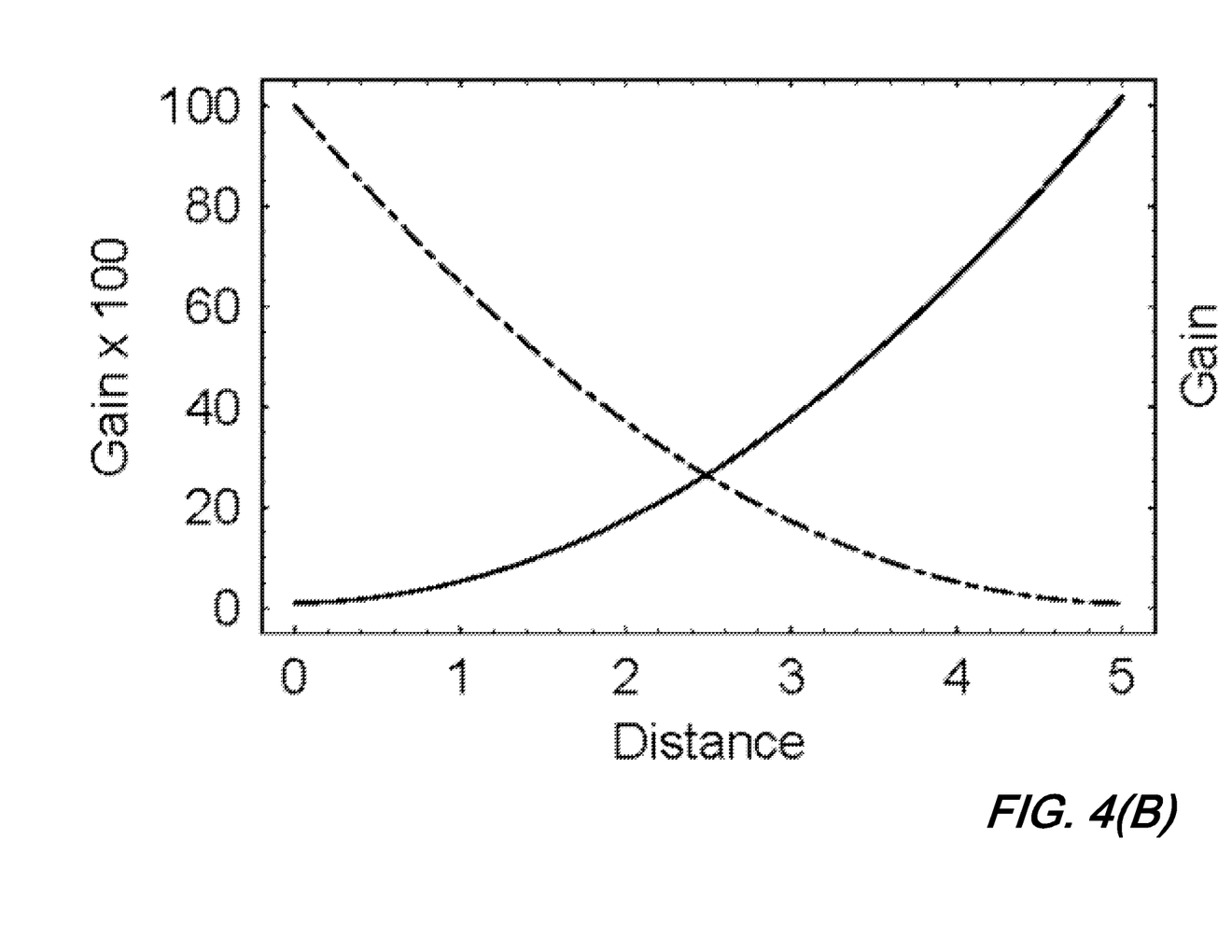

The dependence of the signal power on phase and distance is illustrated in FIG. 4. Power is normalized to the input power $10^{-4}$. The signal power (gain) is plotted as a function of the input phase $\phi_0$, for the case in which $z=5$. When $\phi_0 = 0$, the gain is $1+4(\rho^2 z)^2$. The signal power thus increases quadratically with distance. In contrast, when $\phi_0 = \pi/2$, the gain is 1. The signal is not amplified and no idlers are produced. The maximal gain $\{[1+(\rho^2 z)^2]^{1/2}+\rho^2 z\}^2 \approx 4(\rho^2 z)^2$ corresponds to $\phi_0 = 0.099$, whereas the minimal gain $\{[1+(\rho^2 z)^2]^{1/2}-\rho^2 z\}^2 \approx 1/4(\rho^2 z)^2$ corresponds to $\phi_0 = 1.67$. (The phases required to extremal gains depend on distance.) The signal power is also plotted as a function of distance, for the aforementioned values of $\phi_0$. The power of the amplified signal increases from 1 to 102 (20.1 dB), whereas the power of the attenuated signal decreases from 1 to $9.8\times 10^{-3}$ (−20.1 dB). These results show that vector FWM provides (at least) 20 dB of phase-sensitive amplification or attenuation. Neither process is impeded by the generation of idlers.

5. The Preferred Embodiments

Figure 5:
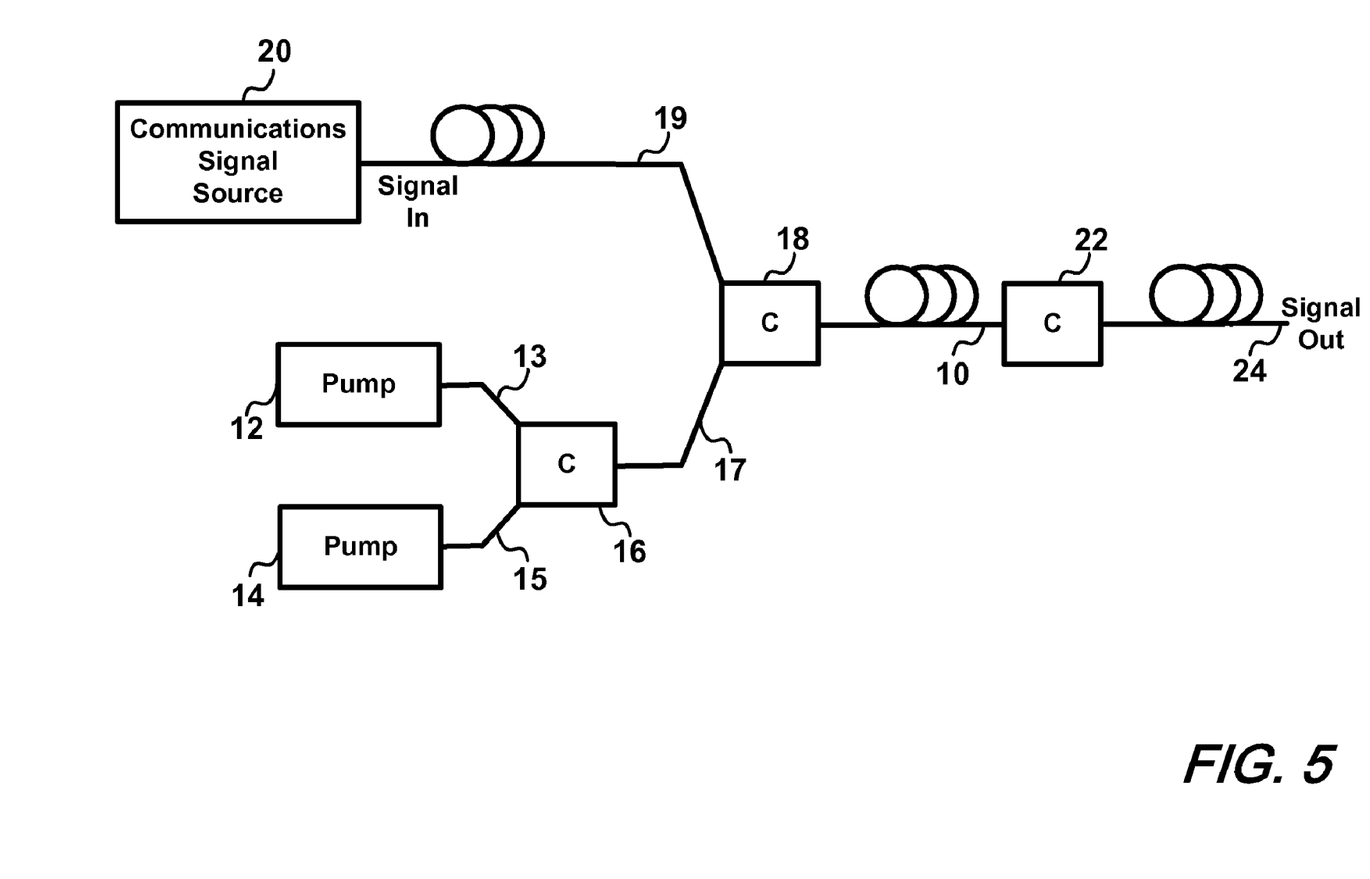
FIG. 5 shows an illustrative optical amplifier in accordance with the invention.

FIG. 5 shows an illustrative implementation of the invention in the form of an optical amplifier comprising a highly non-linear optical fiber 10 capable of producing four-wave mixing. Specific illustrative examples of non-linear fibers include standard single-mode glass fibers, dispersion-shifted fibers, highly-nonlinear fibers, which are randomly birefringent, and micro-structured fibers (which are also called photonic-crystal fibers). Bismuth-doped and chalcogenide fibers are also suitable. More generally, the invention could be made with any medium with a third-order Kerr nonlinearity.

The pumps 12 and 14 produce energy that amplifies a communication signal flowing through the fiber 10. Pump 12 produces polarized electromagnetic pump energy at a predetermined first wavelength $\omega_{-1}$ and predetermined first polarization angle. Pump 14 produces polarized electromagnetic pump energy at a predetermined second wavelength $\omega_1$ and a predetermined second polarization angle. See, for example, vectors labeled −1 and 1 in FIG. 1(B). Preferably, the first and second polarization angles are substantially orthogonal to one another, as shown in FIG. 1(B). The pump energy from the pumps 12 and 14 is coupled to the fiber 10 by means of fibers 13, 15, and 17 and couplers 16 and 18.

An optical communication signal enters the fiber 10 by means of a fiber 19 connected to a communication signal source 20 and a coupler 18. The communication signal has a predetermined third wavelength $\omega_0$ between the first and second wavelengths $\omega_{-1}$ and $\omega_1$ produced by the pumps 12 and 14. Preferably, the wavelength of the communication signal is the average of the first and second wavelengths of the pumps 12 and 14. The communication signal from the source 20 is polarized and has a third polarization angle between the first and second polarization angles of the electromagnetic energy produced by the pumps 12 and 14. Preferably, the third polarization angle is about 45° with respect to the first and second polarization angles.

The amount by which the first and second pump wavelengths differ is not critical as long as there is enough spacing to accommodate the frequency bandwidth of the communication signal. For example, in a 10 Gigabit per second communication system, the first and second pump wavelengths should differ by about 0.4 nm or more.

The optical communication signal is amplified by acquiring energy from the pump electromagnetic energy flowing in the fiber 10. The residual pump electromagnetic energy and any other spurious electromagnetic energy flowing through fiber 10 is removed from the amplified communication signal by a filter 22. The amplified and filtered communication signal is output from the optical amplifier of FIG. 5 through another fiber 24.

Figure 6:
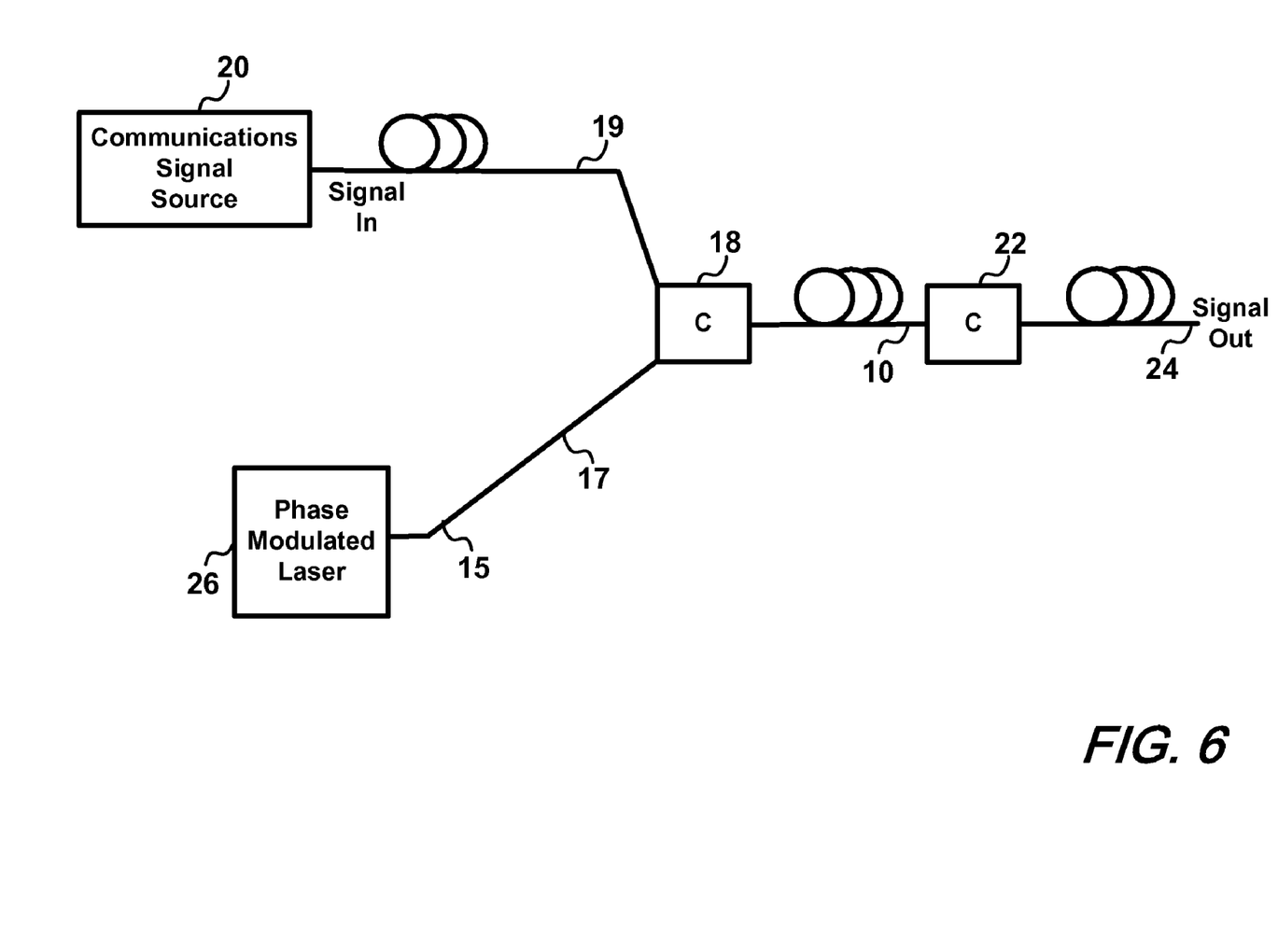
FIG. 6 shows another illustrative optical amplifier in accordance with the invention.

FIG. 6 shows another optical amplifier in accordance with the invention. In situations where the wavelengths of the two pump waves are relatively close together, it is possible to implement the two pumps 12 and 14 in the form of a single phase-modulated laser 26 connected directly to fiber 17. The phase-modulated laser 26 produces pump energy at the previously described first and second wavelengths, and first and (with the assistance of a polarization rotator) second polarization angles. In all other respects, the optical amplifier in FIG. 6 is the same as the optical amplifier in FIG. 5.

In both FIG. 5 and FIG. 6, the optical amplifiers in accordance with this invention produce significant phase sensitive amplification of optical communication signals without being significantly affected by frequency cascades.

SUMMARY

Studies have been described of the frequency cascades initiated by two strong pump waves (−1 and 1), and two strong pump waves and a weak signal wave (0), whose frequency is the average of the pump frequencies. These cascades are produced by vector four-wave mixing (FWM) in a randomly birefringent fiber (RBF).

Wave propagation in a RBF is governed by coupled Schroedinger equations (CSE's). However, if the frequencies of the interacting waves are comparable to the zero-dispersion frequency (ZDF) of the fiber, the effects of dispersion are much weaker than those of nonlinearity and can be neglected. In this limit, the CSEs reduce to the coupled-mode equations (3) and (4), which were solved exactly.

The pump-pump cascade [Eqs. (11) and (12)] is phase insensitive. Parallel pumps produce a strong cascade with many harmonics. However, as the pump misalignment increases, the number and strength of the harmonics decrease. Perpendicular pumps do not produce a cascade.

The absence of a pump-pump cascade modifies the properties of the associated pump-signal cascade [Eqs. (15) and (16)], which is phase sensitive. If the signal is inclined at 45° to the pumps, only two strong harmonics (idlers) are produced (−2 and 2). These idlers are produced by the pumps and signal, but do not affect the signal adversely. For parameters that are typical of current experiments, the signal can be amplified or attenuated by more than 20 dB, depending on its input phase.

In conclusion, vector FWM near the ZDF of a RBF produces phase-sensitive amplification with the classical properties of a one-mode squeezing transformation. This result is important, because it is easier to phase-lock pumps with similar frequencies (produced by one laser and a phase modulator) than pumps with dissimilar frequencies (produced by two separate lasers).

The invention claimed is:

1. A phase-sensitive parametric optical amplifier, comprising:
   a highly non-linear optical fiber capable of producing four-wave mixing;
   a first pump adapted to input polarized electromagnetic energy having a first polarization angle and a first wavelength into the highly non-linear optical fiber;
   a second pump adapted to input polarized electromagnetic energy having a second polarization angle and a second wavelength into the highly non-linear optical fiber; and
   an optical communication signal source adapted to input into the highly non-linear optical fiber a polarized optical communication signal having a third polarization angle between the first and second polarization angles and a third wavelength between the first and second wavelengths.

2. The amplifier of claim 1, in which the first polarization angle is orthogonal to the second polarization angle.

3. The amplifier of claim 2, in which the third polarization angle is about 45° with respect to the first and second polarization angles.

4. The amplifier of claim 1, in which the third wavelength is the average of the first and second wavelengths.

5. The amplifier of claim 2, in which the third wavelength is the average of the first and second wavelengths.

6. The amplifier of claim 3, in which the third wavelength is the average of the first and second wavelengths.

7. The amplifier of claim 1, in which the difference between the first and second wavelengths is greater than about 0.4 nm.

8. The amplifier of claim 2, in which the difference between the first and second wavelengths is greater than about 0.4 nm.

9. The amplifier of claim 3, in which the difference between the first and second wavelengths is greater than about 0.4 nm.

10. A phase-sensitive parametric optical amplifier, comprising:
    a highly non-linear optical fiber capable of producing four-wave mixing;
    a pump adapted to input into the highly non-linear optical fiber a first polarized electromagnetic energy wave having a first polarization angle and a first wavelength and a second polarized electromagnetic having a second polarization angle and a second wavelength; and
    an optical communication signal source adapted to input into the highly non-linear optical fiber a polarized optical communication signal having a third polarization angle between the first and second polarization angles and a third wavelength between the first and second wavelengths.

11. The amplifier of claim 10, in which the pump comprises a phase-modulated laser.

12. The amplifier of claim 10, in which the first polarization angle is orthogonal to the second polarization angle.

13. The amplifier of claim 12, in which the third polarization angle is about 45° with respect to the first and second polarization angles.

14. The amplifier of claim 10, in which the third wavelength is the average of the first and second wavelengths.

15. The amplifier of claim 12, in which the third wavelength is the average of the first and second wavelengths.

16. The amplifier of claim 13, in which the third wavelength is the average of the first and second wavelengths.

17. The amplifier of claim 10, in which the difference between the first and second wavelengths is greater than about 0.4 nm.

18. The apparatus of claim 12, in which the difference between the first and second wavelengths is greater than about 0.4 nm.

19. The apparatus of claim 13, in which the difference between the first and second wavelengths is greater than about 0.4 nm.

20. The apparatus of claim 16, in which the difference between the first and second wavelengths is greater than about 0.4 nm.

21. A method of reducing the effects of frequency cascades in a phase sensitive parametric optical amplifier, comprising the steps of:

inputting first polarized electromagnetic pump energy into a highly non-linear optical fiber capable of producing four-wave mixing, the first pump energy having a first polarization angle and a first wavelength;

inputting second polarized electromagnetic pump energy into the highly non-linear optical fiber, the second pump energy having a second polarization angle and a second wavelength; and inputting a polarized optical communication signal into the highly non-linear optical fiber having a third polarization angle between the first and second polarization angles and a third wavelength between the first and second wavelengths.

* * * * *